US007162357B2

(12) United States Patent
Chatfield et al.

(10) Patent No.: US 7,162,357 B2
(45) **Date of Patent: *Jan. 9, 2007**

(54) SIGNAL CONDITIONER AND USER INTERFACE

(75) Inventors: Glen F. Chatfield, Bradfordwoods, PA (US); Roy D. Houston, Bethel Park, PA (US)

(73) Assignee: Optimum Power Technology, Bridgeville, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/333,014

(22) Filed: Jan. 17, 2006

(65) Prior Publication Data

US 2006/0116809 A1 Jun. 1, 2006

Related U.S. Application Data

(63) Continuation of application No. 10/663,862, filed on Sep. 16, 2003, now Pat. No. 7,031,823.

(51) Int. Cl.
*G06D 1/99* (2006.01)
*F02M 51/00* (2006.01)
*B60T 7/12* (2006.01)
*G06F 19/00* (2006.01)
*G01M 19/00* (2006.01)

(52) U.S. Cl. ...................... 701/104; 701/105; 701/114; 701/115; 123/486; 123/488; 73/118.2

(58) Field of Classification Search ........... 123/339.11, 123/339.14, 339.21, 352, 357, 478, 480, 123/486, 488; 701/29–36, 101–105, 114, 701/115; 73/118.1, 118.2; 340/425.5, 438, 340/439, 901
See application file for complete search history.

(56) References Cited

U.S. PATENT DOCUMENTS

| | | | | | |
|---|---|---|---|---|---|
| 3,370,218 | A | * | 2/1968 | Merz | 123/357 |
| 3,911,883 | A | * | 10/1975 | Williams et al. | 123/488 |
| 4,513,711 | A | * | 4/1985 | Braun et al. | 123/352 |
| 4,702,214 | A | * | 10/1987 | Wataya | 123/488 |
| 4,706,631 | A | * | 11/1987 | Wataya | 123/488 |
| 5,220,895 | A | * | 6/1993 | Curran et al. | 123/491 |
| 5,261,369 | A | * | 11/1993 | Vernier | 123/488 |
| 5,890,080 | A | | 3/1999 | Coverdill et al. | |
| 6,434,450 | B1 | | 8/2002 | Griffin, Jr. et al. | |
| 6,687,597 | B1 | * | 2/2004 | Sulatisky et al. | 701/104 |
| 6,832,472 | B1 | * | 12/2004 | Huang et al. | 123/491 |
| 7,031,823 | B1 | * | 4/2006 | Chatfield et al. | 701/104 |

OTHER PUBLICATIONS

Power Commander Fuel Injection Module. [online]. Dynojet Research, Inc, 2002-2005. Found on the Internet at <URL: www.powercommander.com>.

* cited by examiner

*Primary Examiner*—Willis R. Wolfe, Jr.
(74) *Attorney, Agent, or Firm*—Richard W. James

(57) ABSTRACT

A signal modifying device, user interface, and method of modifying a signal. The signal modifying device includes a processor, a first input coupled to the processor and an output coupled to the processor. Instructions are stored within the processor that, when executed by the processor, cause the processor to provide a signal incident at the output that corresponds to a signal incident at the input.

15 Claims, 9 Drawing Sheets

SIGNAL CONDITIONER AND USER INTERFACE

CROSS-REFERENCE TO RELATED APPLICATIONS

This application is a continuation of U.S. patent application Ser. No. 10/663,862, filed Sep. 16, 2003 now U.S. Pat. No. 7,031,823, which is incorporated herein by reference.

STATEMENT REGARDING FEDERALLY SPONSORED RESEARCH

Not Applicable.

FIELD OF THE INVENTION

The disclosed invention is related to engine control and, particularly, to control of a signal incident at an engine control unit.

BACKGROUND OF THE INVENTION

Engine control units receive signals from various sensed inputs and control engine operation based upon those signals. For example, the temperature or pressure of air entering the combustion air intake of an engine may be sensed to determine the mass of combustion air entering engine cylinders. The engine control unit may determine a mass of fuel to be injected into the engine cylinders based, at least in part, on that mass of air. Other sensed information including battery power applied to a fuel injector may also affect the mass of fuel to be injected.

It is also common for owners of motor vehicles to modify or replace components that effect engine operation. For example, a stock exhaust system may be replaced with an aftermarket exhaust system, or a stock cam may be replaced with an aftermarket cam. When a component effecting engine operation is modified or replaced, the engine control unit may not operate optimally utilizing stock engine control unit settings that control engine operation.

Moreover, when stock components are not modified or replaced, the engine control unit may not operate optimally for a certain operator because stock settings in the engine control unit may have been determined for, for example, a balanced operation that provides a mid-level of power and torque, a mid-level of fuel efficiency, and long engine life, while the operator prefers maximum power and torque without concern for fuel efficiency or engine life.

Thus, there is a need for a device that modifies a signal received by the engine control unit to provide engine operation, such as fueling, suitable for the components utilized with the engine and suitable for engine operation desired by the operator.

There is also a need for a user interface that permits a user to modify functionality of the device that modifies a signal received by the engine control unit. Moreover, there is a need for a user interface that permits a user to view information related to the operation of the engine.

SUMMARY OF THE INVENTION

In an embodiment of the present invention, a signal modifying device is contemplated. That signal modifying device includes a processor, a first input coupled to the processor and an output coupled to the processor. That signal modifying device may also include one or more additional inputs. Instructions are stored within the processor that, when executed by the processor, cause the processor to provide a signal incident at the output that corresponds to a signal incident at the input. The signal at the output may be offset based on a factor or based on the additional inputs.

A plurality of modifiers may be stored in memory or a storage device coupled to the processor. Those modifiers may be indexed based on the second and third inputs, which may represent, for example, actual engine operating level and desired engine operating level. That engine operating level might include, for example, engine speed in rpm and that desired engine operating level may include, for example, throttle position. The output may then be offset from the first input based on the current modifier wherein the current modifier corresponds to the current engine speed and throttle position. The output may, in turn, be coupled to an input to which the first input was originally or might otherwise be coupled so as to modify that input and thereby alter operation of the controlled device. That controlled device may be, for example, a fuel injector in an internal combustion engine.

A method of modifying a signal is also contemplated. That method includes uncoupling a signal that controls mass of fuel injected into a cylinder from an engine control unit input and coupling the signal to a signal conditioning device input. The signal conditioning device then modifies the signal based on a current engine speed and current throttle position. The modified signal is then coupled to the engine control unit input.

That method may utilize a user variable value that is associated with a range of engine speed and a range of throttle position. The signal may then be modified based on the value associated with the current engine speed and the current throttle position.

A user interface is also contemplated. The user interface includes a first switch, a second switch, and a display. The first switch causes the user interface to perform a first function when actuated for a short duration and causes the user interface to perform a second function when actuated for a long duration. The second switch causes the user interface to perform a third function when actuated for a short duration and causes the user interface to perform a fourth function when actuated for a long duration. The display provides information related to the selections made at the first and second switches.

When utilized in connection with a signal modifying device that alters fueling level of an internal combustion engine, the first function may select a control table containing modifiers, the second function may select an area of the control table, the third function may step a value related to the selected region of the selected control table, and the fourth function may switch the third function between stepping in a positive direction and a negative direction.

BRIEF DESCRIPTION OF THE DRAWINGS

The accompanying drawings, which are incorporated herein and constitute part of this specification, include one or more embodiments of the invention and, together with the background given above and the detailed description given below, serve to disclose principles of the invention in accordance with a best mode contemplated for carrying out the invention.

DETAILED DESCRIPTION OF THE INVENTION

Figure 1:
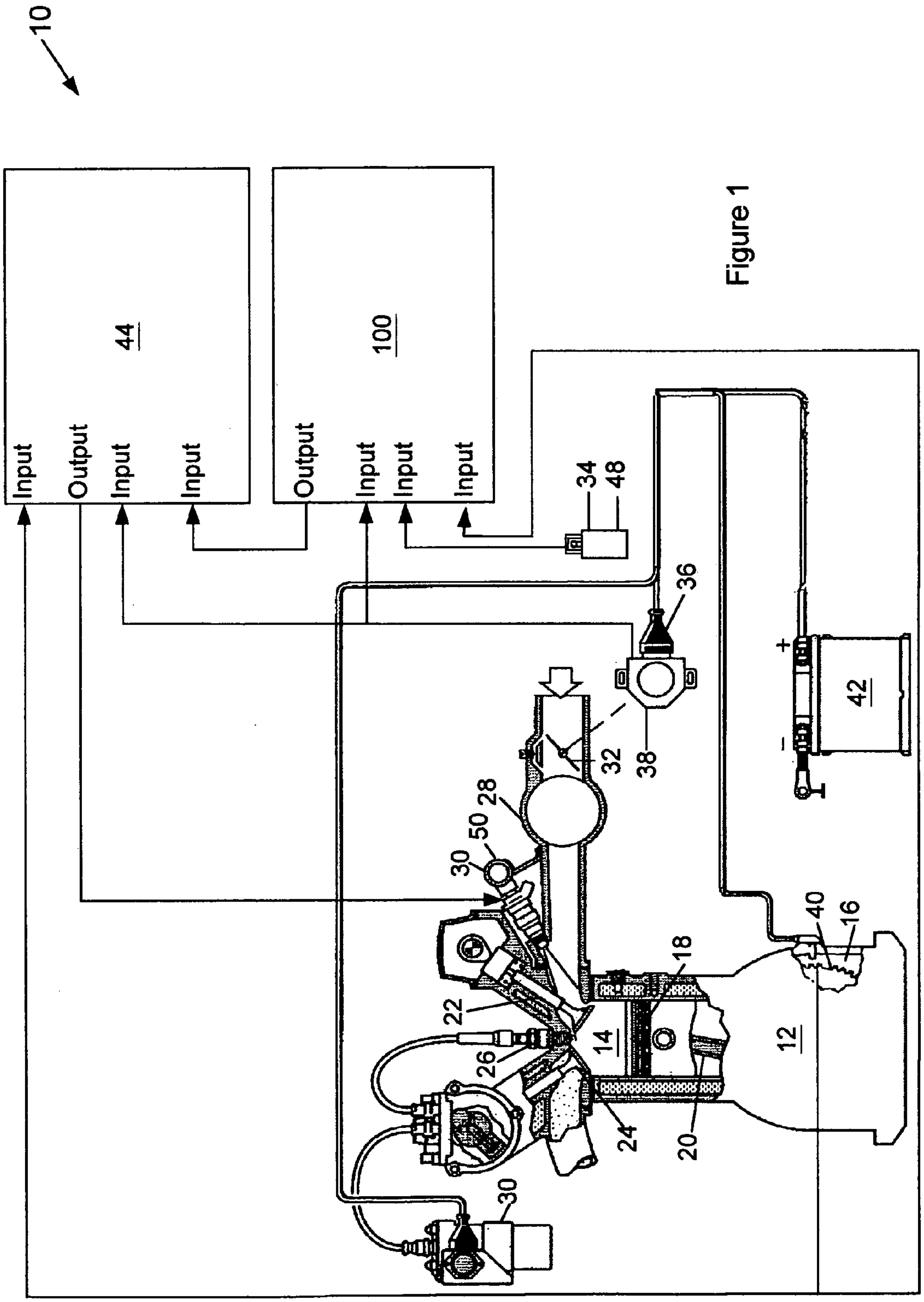
FIG. 1 illustrates an engine system suitable for use of an embodiment of the present invention.

Reference will now be made to the preferred embodiments of the present invention, examples of which are illustrated in the accompanying drawings. It is to be understood that the figures and descriptions of the present invention included herein illustrate and describe elements that are of particular relevance to the present invention, while eliminating, for purpose of clarity, other elements found in typical engines, engine control units, and user interfaces. It is also to be understood that the preferred embodiments described herein are not exhaustive of embodiments of the invention, but are provided as examples of configurations and uses of the invention.

The signal conditioning devices and techniques described herein provide solutions to the shortcomings of certain engine control systems. Those of ordinary skill in engine control technology will readily appreciate that the devices and techniques, while described in connection with fuel control through modification of an ambient temperature signal, are equally applicable to other engine control applications including, for example, spark advance control and may modify other sensor signals including, for example, air intake pressure or battery voltage. Other details, features, and advantages of the signal conditioning devices and techniques and the user interface will become further apparent in the following detailed description of the embodiments.

Any reference in the specification to "one embodiment," "a certain embodiment," or a similar reference to an embodiment is intended to indicate that a particular feature, structure, or characteristic described in connection with the embodiment is included in at least one embodiment of the invention. The appearances of such terms in various places in the specification are not necessarily all referring to the same embodiment. References to "or" are furthermore intended as inclusive so "or" may indicate one or the other ored terms or more than one ored term.

An embodiment of the present invention includes a signal conditioning device that modifies a sensed signal based on engine speed and throttle position. In that embodiment a signal from a sensor to the engine control unit may be intercepted and modified by a signal conditioning device embodying the present invention, thus altering operation of the engine control unit by changing the signal transmitted to the engine control unit. Such interception and modification of a sensor signal may be desirable when, for example, components of the engine controlled by the engine control unit have been modified such that the stock engine control unit no longer controls the engine properly or when a change in stock engine operation is desired.

Another embodiment includes a signal conditioning device that modifies an output signal based on engine speed and throttle position. In that embodiment a signal sent to an actuator may be intercepted and modified by the signal conditioning device. Such interception and modification of a signal may alter operation of an engine by changing an amount of fuel that might otherwise have been provided to the engine. Such interception of an output signal or any signal may also be desirable when, for example, components of the engine controlled by the engine control unit have been modified such that the stock engine control unit no longer controls the engine properly or when a change in stock engine operation is desired.

The signal may, for example, be a signal from an engine control unit to a fuel control device, such as a pulse-width modulated signal to a fuel injection actuator. It should be recognized that any signal may be intercepted and modified by the signal conditioning device.

In yet another embodiment, a signal may be read by the signal conditioner without disconnecting that signal either from its source or destination, but rather by reading the signal in parallel or series with the destination. The signal conditioner may then send a second signal to the destination as desired.

For example, the intercepted signal may be a pulse-width modulated primary fueling signal sent from an engine control unit to a fuel injector. That primary fueling signal may be read at the signal conditioner through a coupling from the primary fueling signal to the input of the signal conditioner to determine the length of the pulse sent to the fuel injector. The output of the signal conditioner may also be coupled to the fuel injector and provide an additional fueling signal in, for example, the form of a pulse, to the fuel injector, thereby providing additional fuel to the engine to which the fuel injector is attached. Moreover, the additional fueling signal may be a portion of the primary fueling signal and may be calculated, for example, by multiplying the primary fueling signal by a factor.

FIG. 1 illustrates an engine system 10 incorporating an embodiment of a signal modification device 100 that controls fuel delivery by altering a signal transmitted from a sensor 34 that affects the quantity of fuel delivered to the engine 12 or cylinder 14, as determined by an engine control unit 44. The engine fueling system 10 includes an internal combustion engine 12 having a cylinder 14, and a crankshaft 16. The cylinder 14 contains a piston 18 having a connecting rod 20 that connects to the crankshaft 16. An intake valve 22, an exhaust valve 24 and a spark plug 26 extend into the cylinder 14.

An air intake control device 28 and a fuel supply control device 30 provide air and fuel to the intake valve 22 and the cylinder 14. The air intake control device 28 may include, for example, a butterfly valve 32 or gate valve to control the quantity of combustion air delivered to the engine 12. An air mass sensor 34, which may be, for example, a temperature sensor 48 or pressure sensor (not shown), may be located in the air intake. Another sensor signal that affects the air/fuel ratio, where that is the goal of the signal modifying system, such as battery voltage to a fuel injector, may alternately be conditioned by the signal modifying device.

The air mass sensor 34 provides information from which it is possible to calculate the mass of air entering one or more cylinders 14. The mass of air delivered to one or more cylinders 14 may, for example, be equal to the volume of the cylinder 14 times the density of the air. Air density is furthermore related to air pressure and inversely related to air temperature. Thus, pressure or temperature of air entering the cylinder 14 are related to air mass and may be utilized to calculate or estimate the mass or air entering the cylinder 14. Where, for example, an atmospheric or intake temperature sensor 48 provides a signal to an engine control unit 44 that is used to calculate the mass of air entering the cylinder 14, the signal transmitted from that temperature sensor 48 may be altered by the signal modification device 100 such that the engine control unit 44 receives an indication that a different mass of air is entering the cylinder 14 than is actually entering the cylinder 14.

Varying the mass of air entering the cylinder or cylinders 14 as sensed by the engine control unit 44 may cause the engine control unit 44 to vary the amount of fuel provided to the cylinder 14 to maintain a desired air/fuel ratio. The engine control unit 44 will typically determine from a table or map a fuel quantity to be delivered for a given air mass. Thus, the engine control unit 44 may be caused to vary the mass of fuel being delivered to a cylinder 14 by varying an air temperature signal from the temperature sensor 48.

The fuel supply control device 30 may be, for example, a fuel injector 50 or a carburetor. The fuel injector 50 or carburetor may include an actuator coupled thereto to control fuel flow through the fuel injector 50 or carburetor. A signal, such as a pulse-width modulated signal, may be transmitted from the engine control unit 44 to the actuator to provide fuel flow through the fuel injector 50 or carburetor.

A throttle position sensor 36 may be attached to sense the position of an operator actuated throttle switch 38. An engine encoder 40 may sense rotation of the crankshaft 16. A battery 42 may provide power to portions of the engine system 10 requiring electrical power.

Figure 2:
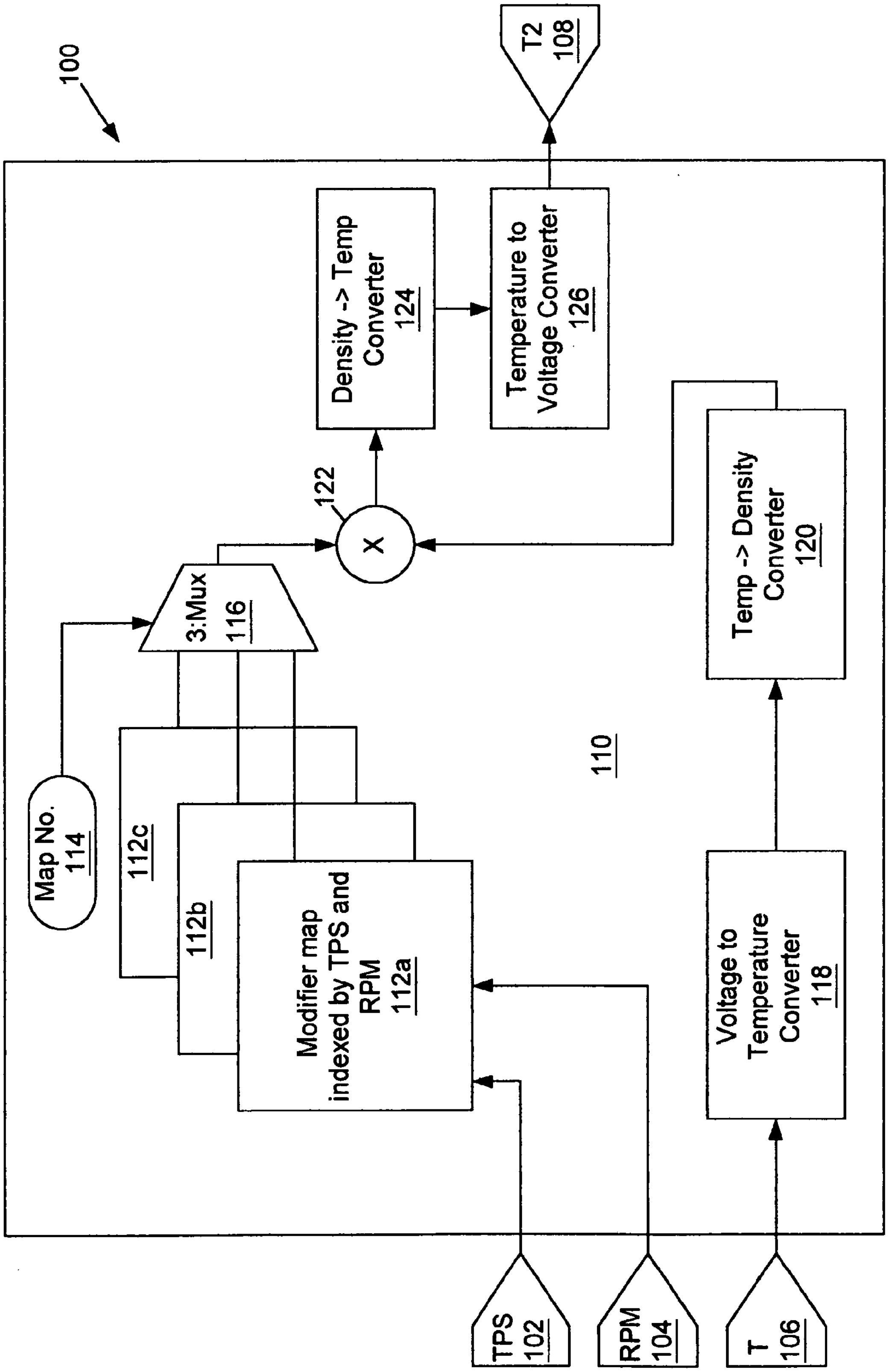
FIG. 2 is a block diagram of an embodiment of a signal modification device of the present invention.

The components of the engine system 10 may operate in a known fashion, while control of, for example, the amount of fuel to be provided by the fuel supply device 42 may be varied by a signal modification device 100 such as the signal modification device 100 illustrated in FIG. 2.

FIG. 2 is a block diagram of an embodiment of a signal modification device 100 of the present invention. The device 100 receives three inputs: a throttle position signal 102 that may be received from the throttle position sensor 36, an engine speed signal 104 that may be received from a crankshaft angular motion sensor such as, for example, the engine encoder 40 that indicates engine speed in rotations per minute ("rpm"), and a temperature signal 106 that may be received from the temperature sensor 48 located, for example, external to the engine or in the combustion air intake of the engine. Alternately, the temperature sensor may be replaced with, or used in conjunction with, a pressure sensor providing an atmospheric pressure signal to the signal modification device 100 or another sensor that indicates the mass of air entering engine cylinder or cylinders 14.

The signal modification device 100 provides an output 108 that may correspond to the temperature signal 106. Where the temperature signal 106 is an atmospheric temperature signal, a signal may be incident at the output 108 that is equal to or varies in relation to the temperature signal 106. The variation of the signal at the output 108 from the temperature signal 106 may be determined by the hardware or software contained within the signal modification device 100.

The signal incident at the output may be a signal that corresponds to the atmospheric temperature signal 106, but is offset from the atmospheric temperature signal 106. In that way, where the atmospheric temperature signal 106 is uncoupled from a controller such as an engine control unit 44 and input into the signal modification device 100 at 106, the output 108 may be coupled to the engine control unit 44 in place of the atmospheric temperature signal 106 to provide a modified atmospheric temperature signal to the engine control unit 44.

The signals 102, 104, 106, and 108 may be any signals that may be read into or output from a standard control device. For example, the atmospheric temperature signal 106 may be a 0–5v signal, a 4–20 ma signal, or a resistive signal from, for example, a thermocouple, thermistor, or RTD type sensor. The communication media coupling sensors to the engine control unit 44 or signal modification device 100 may include twisted pair, co-axial cable, optical fibers, and wireless communication techniques such as use of radio frequency.

Figure 3:
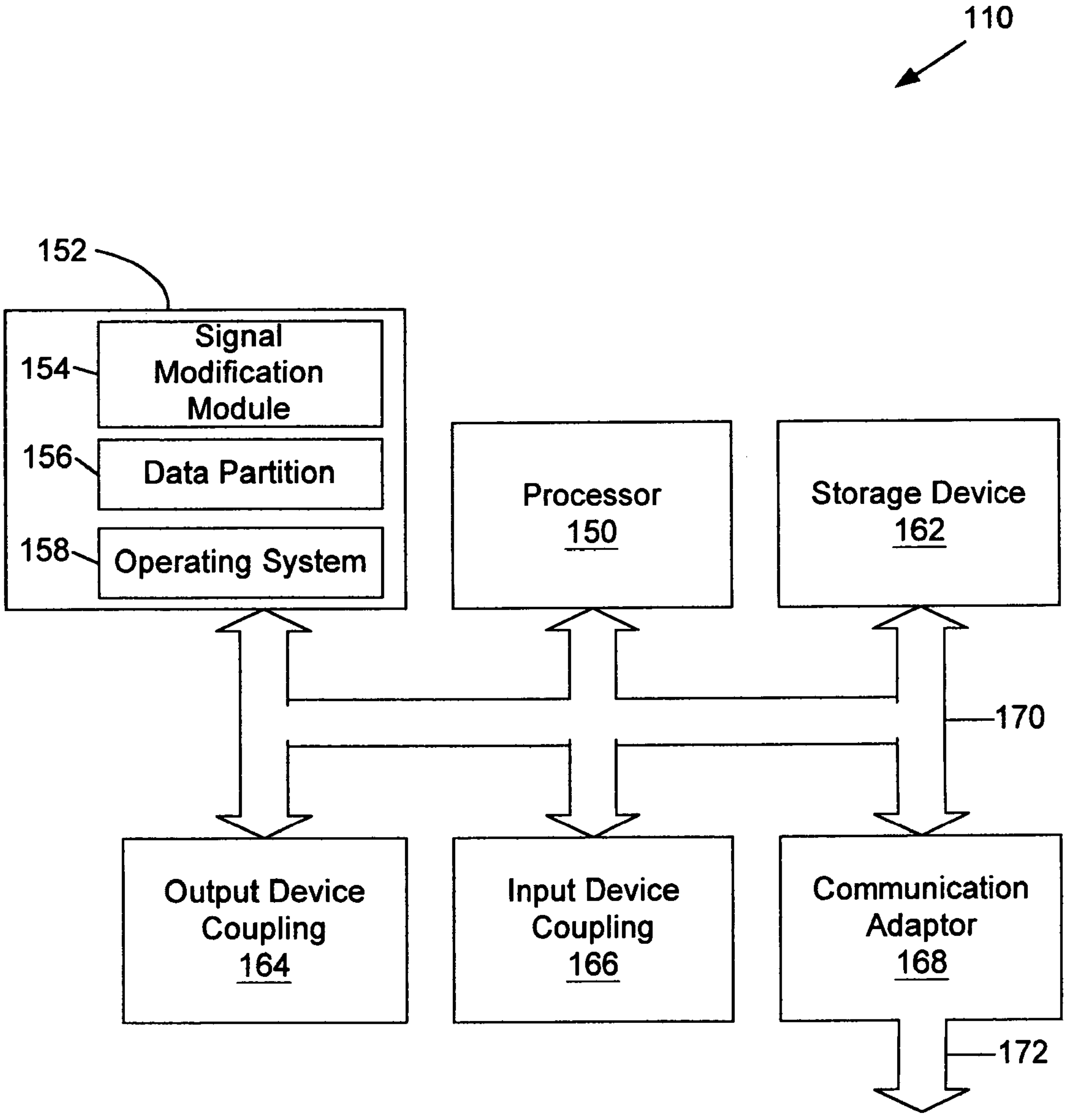
FIG. 3 illustrates an embodiment of control circuitry that may be utilized with the present invention.

As shown in FIG. 3, the control circuitry 110 may include a processor 150, memory 152, a storage device 162, a coupling for an output device 164, a coupling for an input device 166, and a communication adaptor 168. Communication between the processor 150, the storage device 162, the output device coupling 164, the input device coupling 166, and the communication adaptor 168 is accomplished by way of one or more communication busses 170. It should be recognized that the control circuitry 110 may have fewer components or more components than shown in FIG. 3. For example, if a user interface is not desired, the input device coupling 166 or output device coupling 164 may not be included with the control circuitry 110.

The memory 152 may, for example, include random access memory (RAM), dynamic RAM, and/or read only memory (ROM) (e.g., programmable ROM, erasable programmable ROM, or electronically erasable programmable ROM) and may store computer program instructions and information. The memory 152 may furthermore be partitioned into sections including an operating system partition 158 where system operating instructions are stored, a data partition 156 in which data is stored, and a signal modification partition 154 in which signal modification operational instructions are stored. The signal modification partition 154 includes circuitry or code that receives a signal value from, for example, the temperature signal 106 and calculates an appropriate output value to be made incident at the output 108. The signal modification partition 154 may store program instructions and allow execution by the processor 150 of those program instructions. The data partition 156 may furthermore store data such as, for example, two dimensional look-up tables or maps to be used during the execution of the program instructions.

The processor 150 may, for example, be an Intel® Pentium® type processor or another processor manufactured by, for example Motorola®, Compaq®, AMD®, or Sun Microsystems®. The processor 150 may furthermore execute the program instructions and process the data stored in the memory 152. In one embodiment, the instructions are stored in memory 152 in a compressed and/or encrypted format. As used herein the phrase, "executed by a processor" is intended to encompass instructions stored in a compressed and/or encrypted format, as well as instructions that may be compiled or installed by an installer before being executed by the processor 150.

The storage device 162 may, for example, be non-volatile battery backed SRAM, a magnetic disk (e.g., floppy disk and hard drive), optical disk (e.g., CD-ROM) or any other device or signal that can store digital information. The communication adaptor 168 permits communication between the control circuitry 110 and other devices or nodes coupled to the communication adaptor 168 at the communication adaptor port 172. The communication adaptor 168 may be a network interface that transfers information from a node such as a general purpose computer to the control circuitry 110 or from the control circuitry 110 to a node. It will be recognized that the control circuitry 110 may alternately or in addition be coupled directly to one or more other devices through one or more input/output adaptors (not shown).

Figure 5:
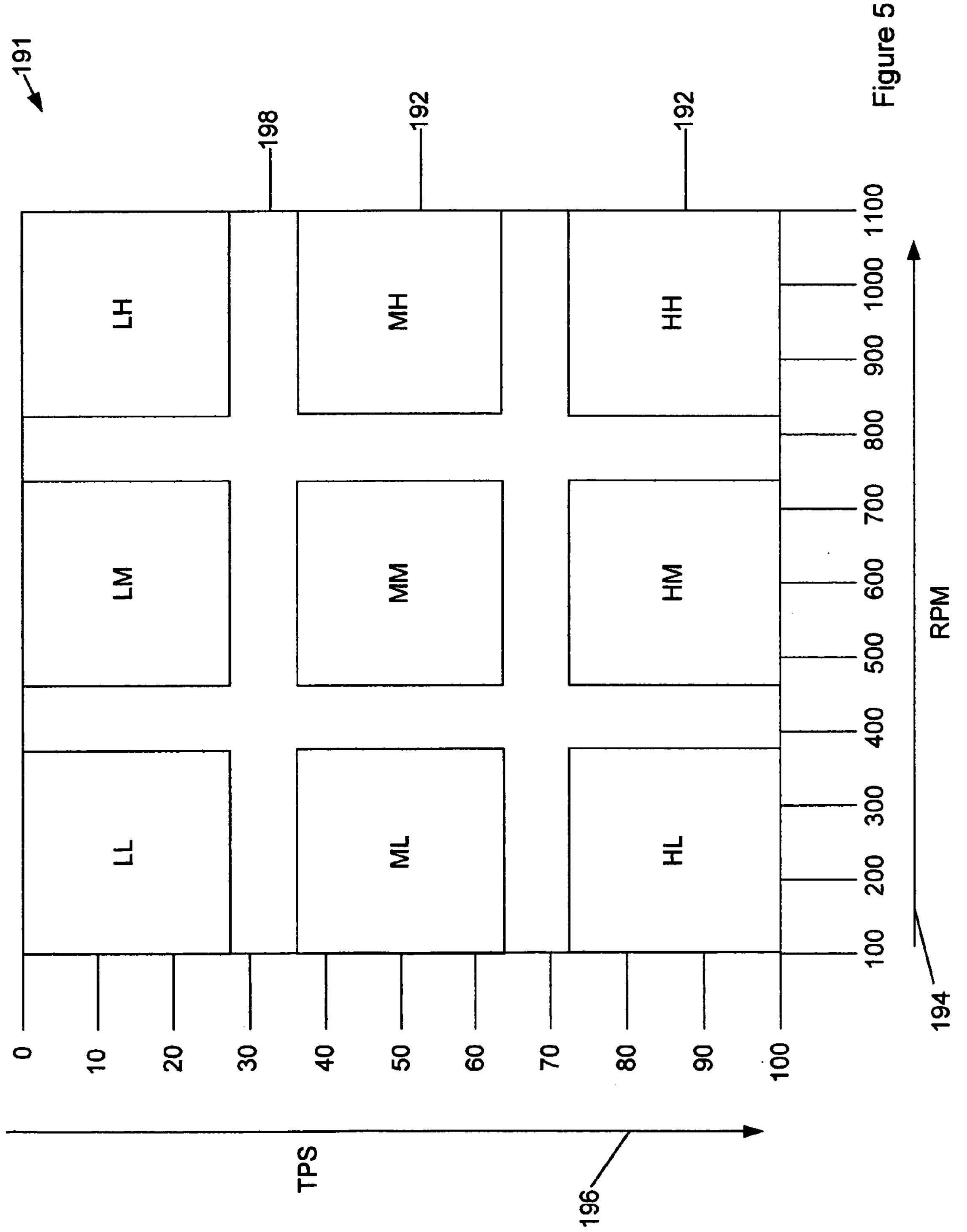
FIG. 5 illustrates an embodiment of a user interface of the present invention.

The input device coupling 166 and output device coupling 164 may couple one or more devices such as, for example, the user interface 200 illustrated in FIG. 5. It will be recognized, however, that the control circuitry 110 does not necessarily need to have an input device 200 or an output device 200 to operate. Moreover, the storage device 162 may also not be necessary for operation of the control circuitry 110 as maps and other data may be stored in memory, for example.

The elements 150, 152, 162, 164, 166, and 168 related to the control circuitry 110 may communicate by way of one or more communication busses 170. Those busses 170 may include, for example, a system bus, a peripheral component interface bus, and an industry standard architecture bus.

Returning to FIG. 2, the control circuitry may include one or more maps 112*a*, 112*b*, and 112*c*, a map selection pointer 114, a multiplexer 116, a voltage to temperature converter 118, a temperature to density converter 120, a multiplier 122, a density to temperature converter 124, and a temperature to voltage converter 126. Each map may correlate to an engine operating range. That range may be the complete range of possible engine operation or a portion of the possible engine operating range. Engine range of operation may be defined in terms of sensed data such as, for example, engine speed and throttle position. Engine speed may, for example, be sensed in terms of the speed of rotation of the engine crankshaft 16 as sensed by an engine encoder 40. Throttle-position may, for example, be sensed in terms of the position of an operator actuated throttle 38 as sensed by a throttle position sensor 36. Each map may, therefore, be viewed graphically as a two-dimensional array with engine speed lying on a first, for example, horizontal axis and throttle position lying on a second, for example, vertical axis.

Figure 4:
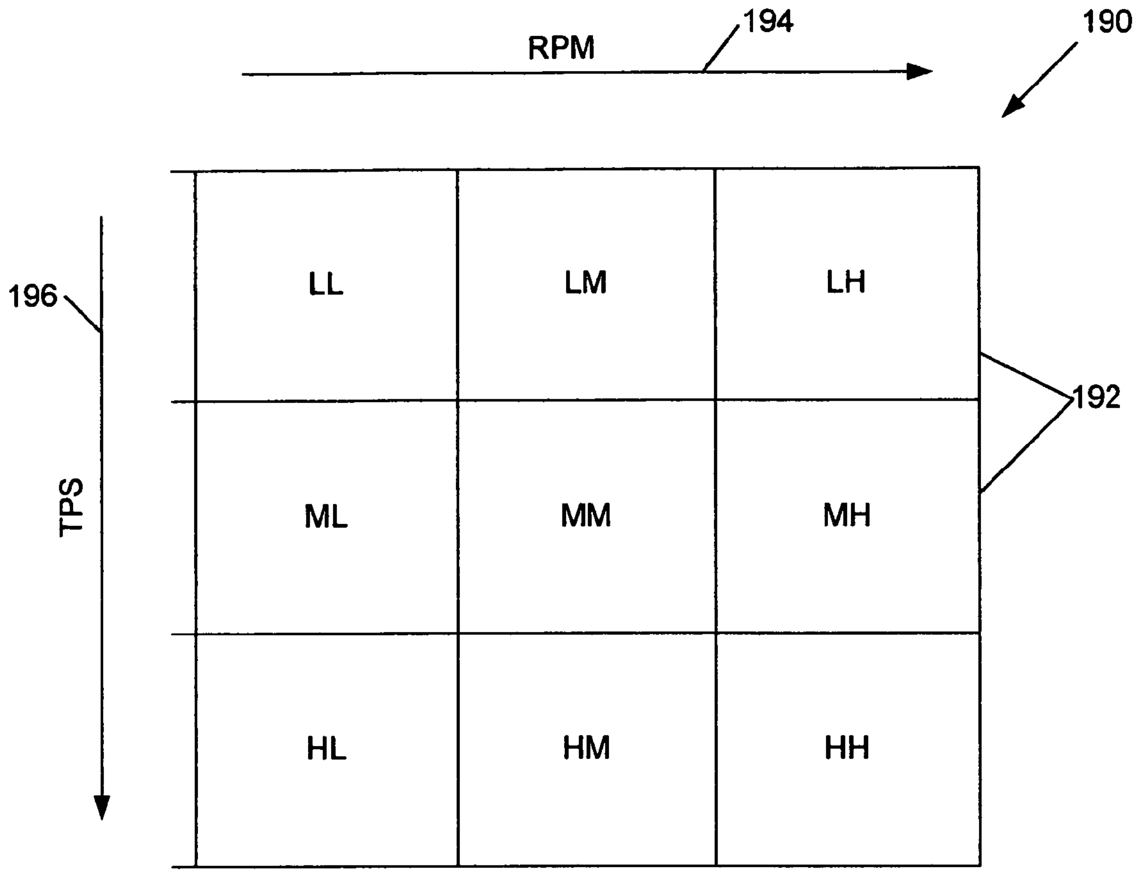
FIG. 4 illustrates an embodiment of a fuel modifier map of the present invention.

FIG. 4 illustrates a fuel modifier map 190 divided into nine modifier regions 192. Engine speed is illustrated on the horizontal axis 194 and throttle position is illustrated on the vertical axis 196. A plurality of such maps may be included in a single signal modification device 100. For example, a first "stock" map may provide an output signal equal to the input signal to achieve factory control, a second "performance" map may provide an output signal that causes the engine to operate to achieve greater torque and power, and a third "economy" map may provide an output signal that causes the engine to operate in a way that reduces fuel consumption.

The range of values on each axis may be divided into multiple equal or unequal parts. For example, for a first map 112*a* the total range of engine speed may be 0–12,000 rpm and that total range may be divided into a low range from 0–2000 rpm, a mid-range from 2000–8000 rpm and a high range from 8000–12,000 rpm. The total range for throttle position for that first map 112*a* may be 0–100% with the total range divided into a low range of 0–20%, a mid-range from 20–80% and a high range from 80–100%. When the engine speed is in the low range, that would correspond to a low load column on the map, when the engine speed is in the mid-range range, that would correspond to a middle load column on the map, and when the engine speed is in the high range, that would correspond to a high load column on the map. Similarly, when the throttle position is in the low range, that would correspond to a low throttle position row on the map, when the throttle position is in the mid-range range, that would correspond to a middle throttle position row on the map, and when the throttle position is in the high range, that would correspond to a high throttle position row on the map. With such a division, that first map 112*a* would have nine modifier regions 192 defined by low, middling and high load in the horizontal axis and low, middling and high throttle position in the vertical axis.

A fuel modifier may be placed in each of those nine modifier regions 192. The fuel modifier may be a factor used to modify the air mass signal 106 which, in this example, is an atmospheric temperature sensor. A signal representing that modified value may then be made available at the output 108.

As is shown in FIG. 5, a second fuel modifier map 191 may be utilized having one or more interpolation ranges 198 defined where the modifier regions 192 meet to allow for smooth transitions when engine speed or throttle position transitions between modifier regions 192. For example, a 1000 rpm actual engine speed interpolation range may be defined and a 10% throttle position interpolation range may be defined between each modifier region 192. With such ranges defined, when the lowest or highest 500 rpm level within a modifier region 192 is reached or when the lowest or highest 5% throttle position level within a modifier region 192 is reached, the control circuitry 110 may interpolate between the value of the current modifier region 192 and the value of the neighboring modifier region 192 to smooth the transition between those regions 192.

As illustrated in FIG. 2, the atmospheric temperature air mass signal 106, which may range, for example from 0–5 volts, may be converted into a corresponding temperature by a voltage to temperature converter 118. The air temperature is converted to a corresponding air density at 120. A map to be utilized currently is selected at 114 and the fuel modifier from that map that corresponds to the current engine speed and throttle position is multiplied by the air density at 122, creating a modified air density. The modified air density is converted to a modified temperature that corresponds to that density at 124 and that modified temperature is converted to a 0–5 volt signal to be sent to the output 108 as an appropriate signal.

For example, a temperature signal that varies from 0–5 volts may correspond linearly or non-linearly to temperatures from 0–140 C. The calibration map thus converts the voltage signal of, for example, 3 volts to a corresponding temperature of, for example, 84 C. Temperature to density conversion may take place recognizing that PV=mRT, or a variation on that equation, where P is pressure, V is volume, m is mass, R is a gas constant and T is temperature, which may be expressed in degrees Kelvin. Density may be equal to m/V in that equation. Thus, for example, density may be calculated from temperature assuming constant atmospheric air pressure so that temperature is equal to the constant pressure divided by the gas constant for air times the temperature read. Density may then be varied by, for example, multiplying density by a factor, and the desired output temperature may be set using that equation converted to calculate temperature.

The active modifier that has been selected by the MUX 116 may then be utilized in connection with the calculated density to formulate a density to be utilized. For example, the active modifier may be multiplied by the density to achieve the modified density. Modified density is then converted back to temperature to be output.

Figure 6:
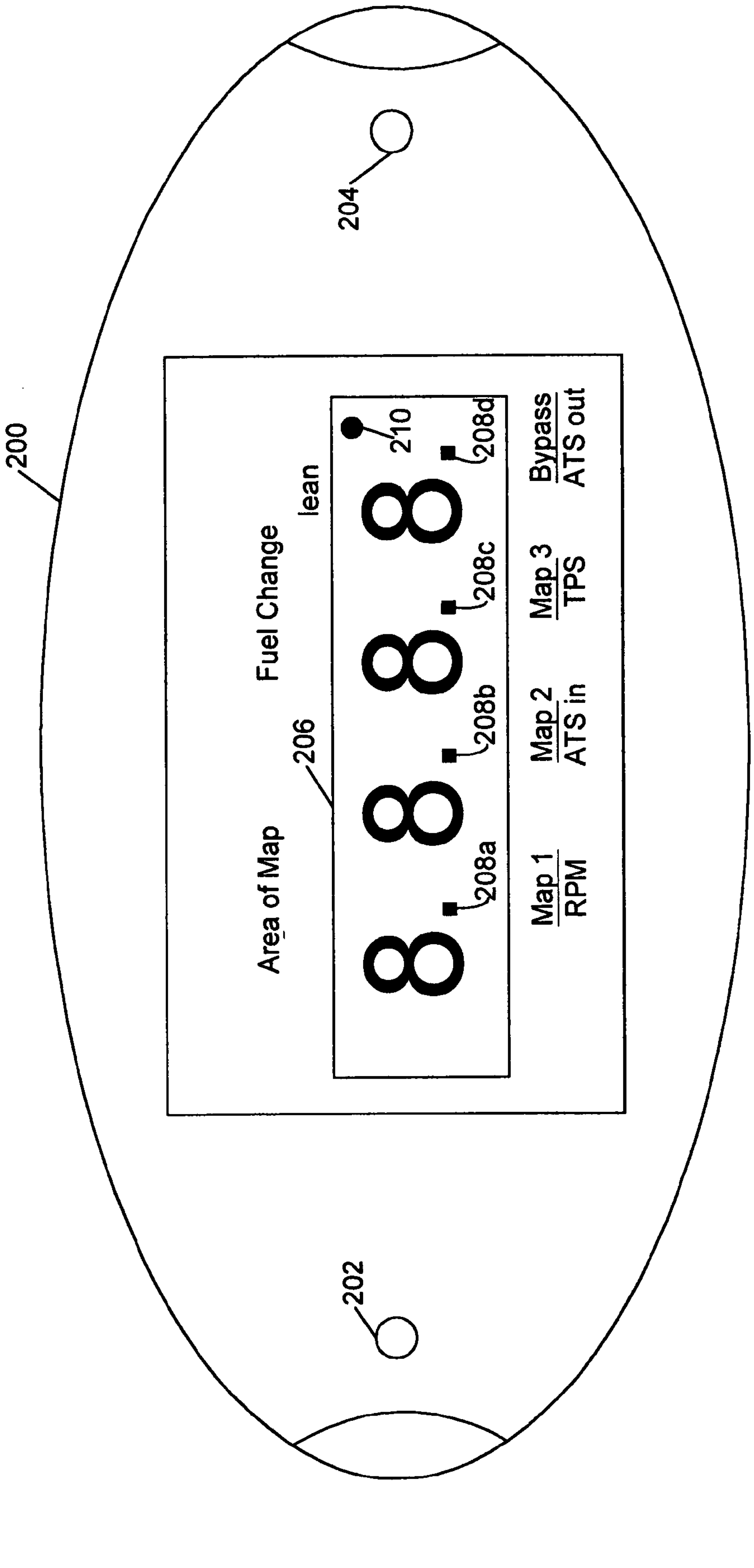
FIG. 6 illustrates a user interface of an embodiment of the present invention.

FIG. 6 illustrates a user interface 200 that may be utilized with the signal conditioner or another engine control device.

The user interface 200 includes a first switch 202, a second switch 204, and a display 206. The first switch 202 and the second switch 204 may be pushbuttons. The display 206 may be a four digit LCD display with a series of first indicators 208 located after each digit 208*a*, 208*b*, 208*c*, and 208*d* and a second indicator 210 that may be located at the upper right of the display 206.

The first switch 202 is able to control two different functions by differentiating between short actuation and long actuation. For example, where the first switch 202 is a pushbutton and the user interface 200 is in calibration mode, pressing the first switch 202 pushbutton for a long duration (e.g., more than one-half of one second) may change the map, or engine control table, that is selected. By repeatedly pressing the first switch 202 pushbutton for long durations, the control circuitry 110 may cycle through the available maps and return to the first map after the last map. As the map selection is varied, the first indicators 208 may illuminate sequentially such that an indicator associated with the selected map is illuminated. For example, as depicted in FIG. 6, when map 1 is selected, the first indicator 208*a*, which appears above "Map 1," would be illuminated. Similarly, when map 2 is selected, the first indicator 208*b* that appears above "Map 2" would be illuminated and when map 3 is selected, the first indicator 208*c* that appears above "Map 3" would be illuminated. When bypass mode is selected, in which the signal modification device 100 is not to modify the signal, the first indicator 208*d* that appears above "bypass" would be illuminated and "PASS" may be shown in the display 206.

Pressing the first switch 202 pushbutton for a short duration (e.g., less than one-half of one second) may change the modifier region 192 within the map that has been selected. Those short duration depressions may be repeated to rotate through the modifier regions 192 of the map and return to the modifier region 192 at the beginning of the map after the last modifier region 192 has been selected. On power-up, the control circuitry 110 may default to the map that was last used before power down and the last selected modifier region 192 in that map.

Figure 7:
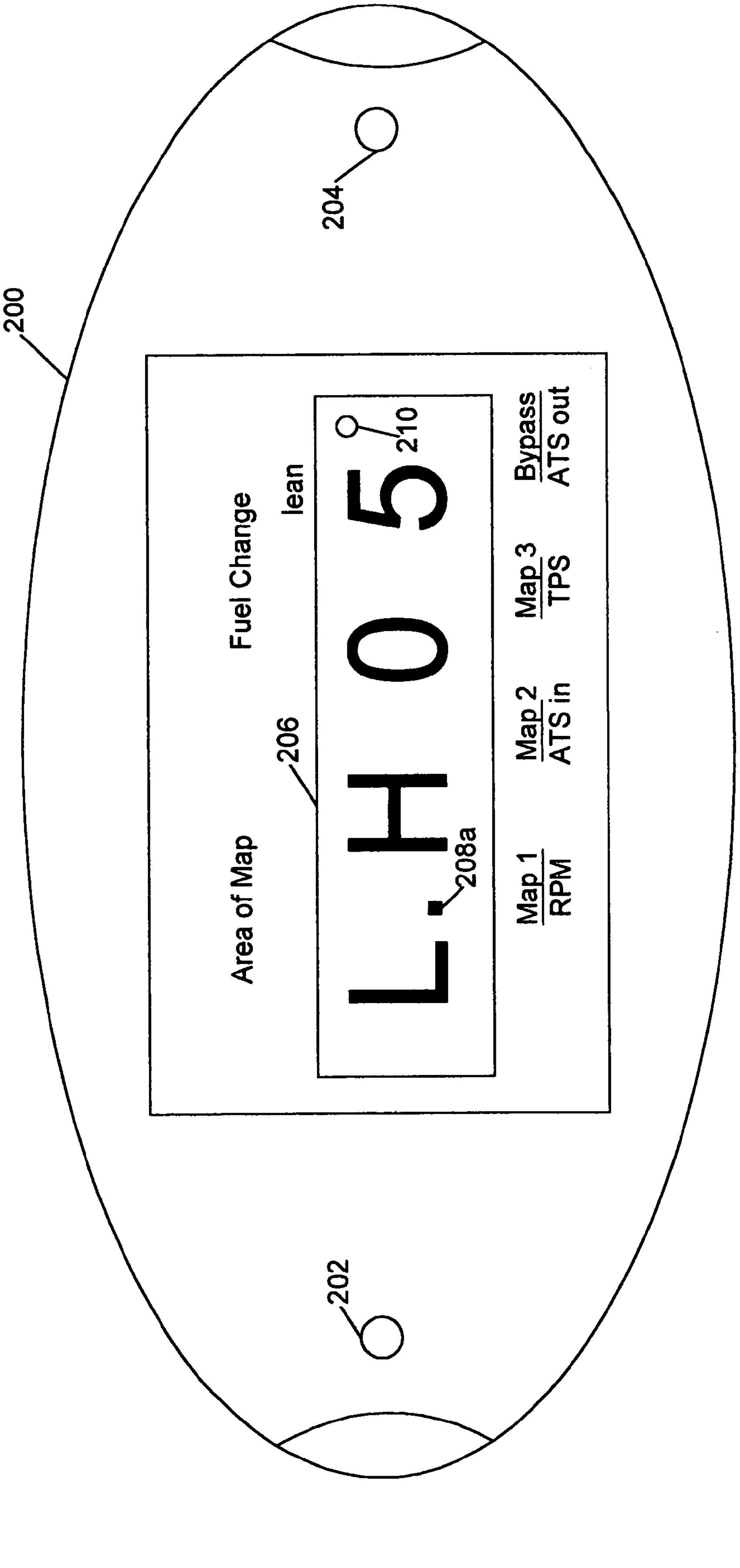
FIG. 7 illustrates a display of the user interface of FIG. 6.

Thus, for example, in the configuration illustrated in FIG. 7, Map 1 has been selected as indicated by the illumination of first indicator 208*a*, and modifier region 192 low-high is selected as indicated by the "LH" in first two digits in the display 206, which indicates that the current engine speed is in the low range and the current throttle position is in the high range. Where the second switch 204 is a pushbutton and the user interface 200 is in calibration mode, pressing the second switch 204 pushbutton for a long duration (e.g., more than one-half of one second) may change the direction in which adjustments to the value in the selected region will be made (e.g., positive or negative adjustments). When a negative adjustment is input, the second indicator 210 may illuminate, as shown in FIG. 6, to indicate, for example in connection with fueling, that a reduction of the amount of fuel indicated in the rightmost two digits of the display 206 is desired, thereby "enleaning" the engine. When a positive adjustment is input, the second indicator 210 may not be illuminated, as illustrated in FIG. 7, to indicate in that example that an enrichment is desired.

Short duration depressions of the second switch 204 pushbutton may step the value in the selected region of the selected map to either incrementally increase or decrease that value. Thus, for example, where the values in the regions of the maps are fuel modifiers, a long duration depression of the second switch 204 pushbutton may cause the fuel modifier to be in an increase mode. One or more short duration depressions of the second switch 204 pushbutton would then cause the fuel modifier to increase a step for each depression. If the second switch 204 pushbutton is then pressed for a long duration, the fuel modifier would be in a decrease mode. One or more short duration depressions of the second switch 204 pushbutton would then cause the fuel modifier to decrease a step for each depression.

It should be recognized that other variations may be employed to increase and decrease values. For example, separate increase and decrease buttons may be utilized so that a long depression or other signal to switch between increase and decrease is not required.

A factor for the low-high modifier region 192 has been set at 05 mg in FIG. 7 and the third indicator is not illuminated, indicating that enrichment by the amount shown is desired and not enleanment. On power-up, the control circuitry 110 may default to the direction of fuel modification that was last used before power down. Moreover, a fuel modification step may represent, for example, a one milligram change in fuel mass delivered to the engine or a one percent change in the amount of fuel that would be delivered if the atmospheric temperature signal 106 was transferred unchanged to the output 108. Furthermore, the display may flash when either the first switch 202 or the second switch 204 has been actuated for a long duration to indicate to the user that the time required to initiate a long duration actuation has expired.

Other modes may also be available through the user interface 200. To change modes, a user may actuate the first switch 202 for a long duration and, while continuing to actuate the first switch 202, actuate the second switch 204 for one or more short durations to scroll through the available modes with each actuation of the second switch 204. In an embodiment, the modes include calibration mode, diagnostic mode, and set point mode.

In diagnostic mode, information contained within the control circuitry 110 may be displayed. That information may include any information that might be useful or of interest to the user. Such information might include sensed values and map related information.

In an embodiment of the user interface 200, wherein the ambient air temperature signal is modified by the signal modification device 100 to influence a quantity of fuel provided to a vehicle, the information available in diagnostic mode may include engine speed in rpm, sensed air temperature in degrees C or F, throttle position in percentage, output air temperature in degrees C or F, and the region of the currently utilized map that corresponds to the current operating speed of the engine and the current throttle position. The display will scroll through those values with each short actuation of the first switch 202.

Figure 8:
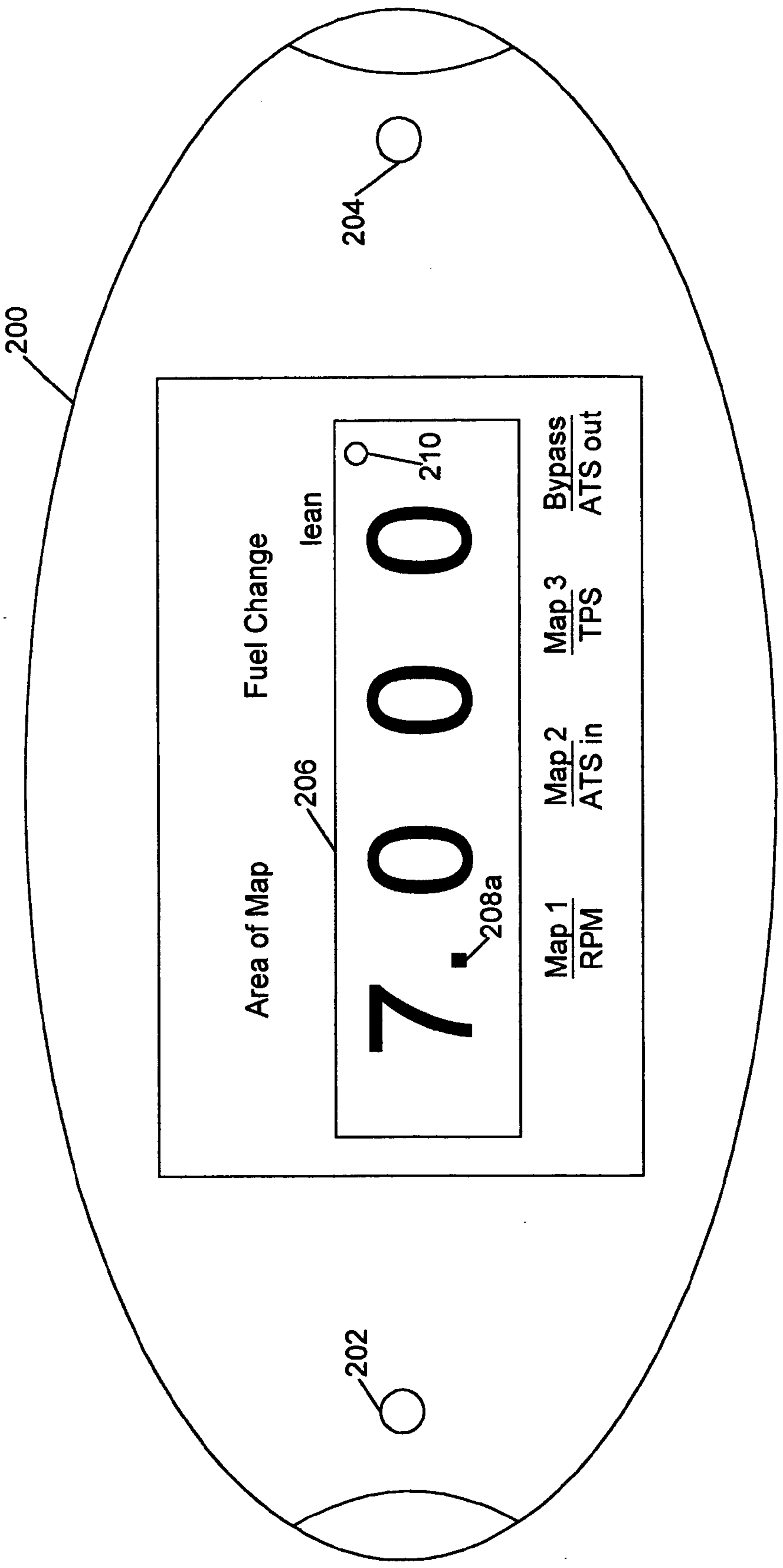
FIG. 8 illustrates another display of the user interface of FIG. 6.

In an embodiment, a current value of an operating parameter is displayed in the digits of the display 206. As shown in FIG. 8, for example, when engine speed is displayed, engine speed in rpm is indicated in the display 206. The value indicated in the display 206 may be multiplied by a multiplier if desired or necessary to arrive at the current engine speed in such an embodiment. The first indicator 208*a* may also be illuminated to indicate that the display 206 is indicating engine speed in RPM. Where an engine speed exceeds ten thousand rpm, the third indicator 212 may be illuminated to indicate that ten thousand should be added to the value displayed to arrive at the current engine speed. In the example illustrated in FIG. 8, the current engine speed is being displayed without the need for a multiplier and that speed is 7000 rpm. Accordingly, the first indicator 208*a* is illuminated above the letters "RPM;" "7000" is displayed in the display 206, indicating that the current engine speed is 7000 rpm; and the second indicator 210 is not illuminated, indicating that ten thousand rpm should not be added to the value shown in the display 206.

The diagnostic mode may have many uses. For example, when a user is adjusting a value in a region of a map to change the amount of fuel to be delivered to a controlled engine, that user may view the input temperature and output temperature to determine the change in that value corresponding to the value in the region. The user may also view engine speed and throttle position to confirm that the current region corresponds to those values. The user could also view the input temperature to confirm that it matches the actual temperature. In addition, the user could simply display engine speed, throttle position, or current map region continuously while operating the engine so that the user will be able to monitor those values for a variety of reasons including determining an area of engine operation that should be modified.

In an embodiment of a set point mode, a short actuation of the first switch 202 will cause the display 200 to rotate through engine speed and throttle set points that distinguish the separation of regions in the maps and, where applicable, define the interpolation bands. Actuation of the second switch 204 increments or decrements the set point value. Thus for example, the set points that may be set in set point mode may include an rpm value that defines the lowest rpm value to be affected by the low rpm region of the map, the highest rpm value to be affected by the low rpm region of the map before interpolation takes affect, the lowest rpm value to be affected by the middle rpm region of the map without interpolation, the highest rpm value to be affected by the middle rpm region of the map before interpolation takes affect, the lowest rpm value to be affected by the high rpm region of the map without interpolation, and the highest rpm value to be affected by the high rpm region of the map.

Those set points may be followed or preceded by set points that include a throttle position value that defines the lowest throttle position value to be affected by the low throttle position region of the map, the highest throttle position value to be affected by the low throttle position region of the map before interpolation takes affect, the lowest throttle position value to be affected by the middle throttle position region of the map without interpolation, the highest throttle position value to be affected by the middle throttle position region of the map before interpolation takes affect, the lowest throttle position value to be affected by the high throttle position region of the map without interpolation, and the highest throttle position value to be affected by the high throttle position region of the map.

In set point mode the left two digits of the display 206 may indicate the set point that is currently displayed and the right two digits may display the value set for that set point. Thus, for example, the right two digits may display "r1" when a set point is to be displayed for the low threshold of the low rpm modifier region 192, "r2" when a set point is to be displayed for the high threshold of the low rpm modifier region 192, "r3" when a set point is to be displayed for the low threshold of the medium rpm modifier region 192, "r4" when a set point is to be displayed for the high threshold of the medium rpm modifier region 192, "r5" when a set point is to be displayed for the low threshold of the high rpm modifier region 192, and "r6" when a set point is to be displayed for the high threshold of the high rpm modifier region 192. A value for the set point displayed in the left two digits of the display 206 may be displayed in the right two digits of the display 206.

Figure 9:
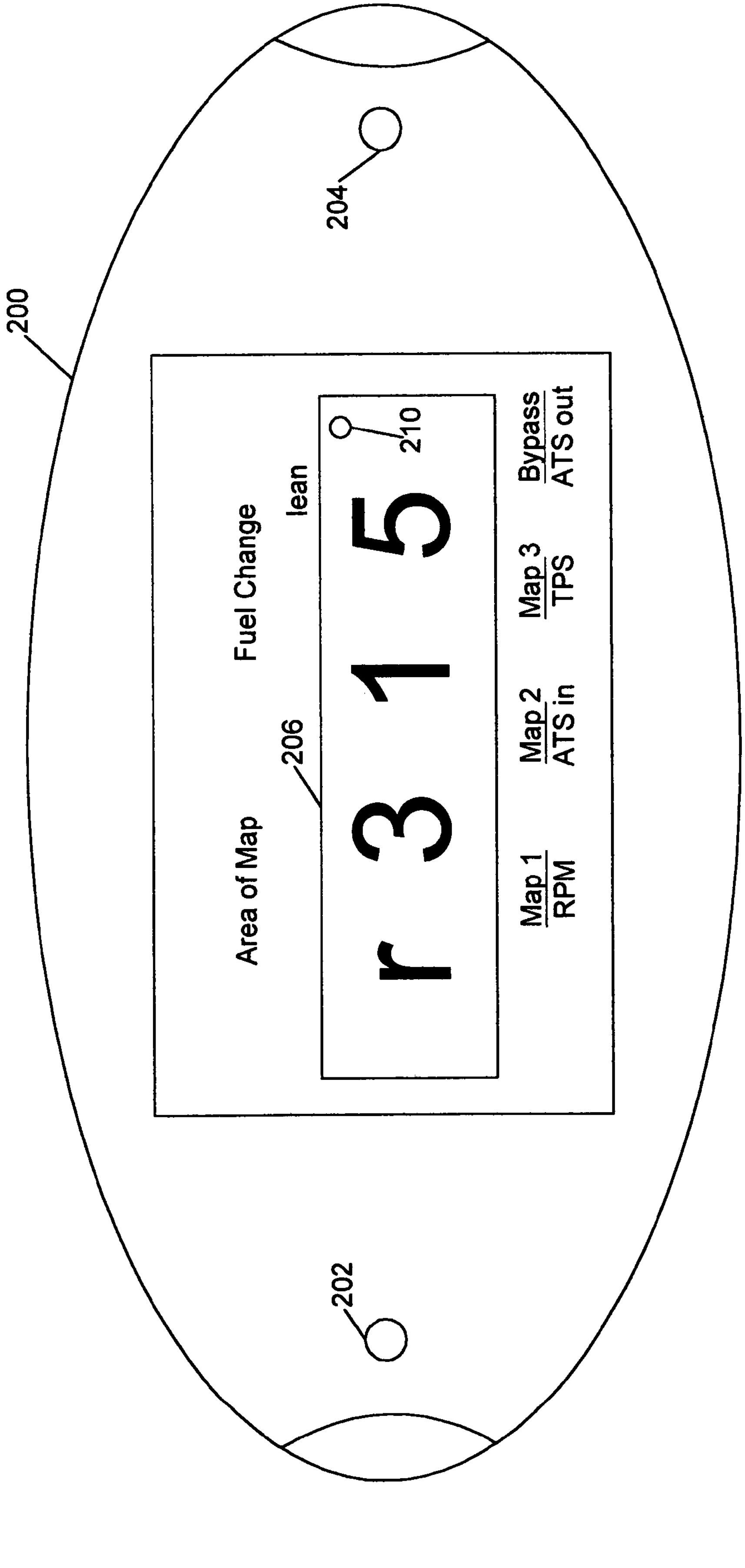
FIG. 9 illustrates yet another display of the user interface of FIG. 6.

FIG. 9 illustrates a sample set point display that depicts a typical display for the low threshold of the medium modifier region 192 for engine speed, with "rP" displayed in the left two digits and "15" displayed in the right two digits of the display 206. The "15" requires the use of a multiplier, as discussed above, and indicates a set point of 1500 rpm.

Similar to setting of engine speed thresholds, throttle position may be set or displayed by having the right two digits display "t1" when a set point is to be displayed for the low threshold of the low throttle position modifier region 192, "t2" when a set point is to be displayed for the high threshold of the low throttle position modifier region 192, "r3" when a set point is to be displayed for the low threshold of the medium throttle position modifier region 192, "r4" when a set point is to be displayed for the high threshold of the medium throttle position modifier region 192, "r5" when a set point is to be displayed for the low threshold of the high throttle position modifier region 192, and "r6" when a set point is to be displayed for the high threshold of the high throttle position modifier region 192. A value for the set point displayed may, likewise, be displayed in the right two digits of the display 206.

In set point mode, the circuitry 110 may furthermore limit check by, for example, not permitting a user to set an rpm set point lower than the value immediately to its left on the maps illustrated in FIG. 4 or 5. Likewise, circuitry 110 may furthermore limit check by, for example, not permitting a user to set a throttle position set point lower than the value immediately above it on the maps illustrated in FIGS. 4 or 5.

At start up, the display 200 may display a "splash screen" that indicates the revision level of the software within the unit. Moreover, at the time the circuitry 110 is deenergized, the last used mode may be retained and displayed upon reenergization of the circuitry 110.

The fueling modifier may furthermore be limited such that, for example, fueling may not be increased more than 15% from the fueling level that would be provided if the atmospheric temperature signal were unmodified and fueling may not be decreased more than 5% from the fueling level that would be provided if the atmospheric temperature signal were unmodified.

The modifier that exists in the region corresponding to the current engine speed and throttle position of the selected map may be used to modify the current atmospheric temperature signal 106. Thus, as engine speed or throttle position change, the control circuitry 110 may move from region to region in the selected map and utilize a modifier value from the region of current operation as engine speed or throttle position change. Moreover, all modifier values and the last used map may be stored in nonvolatile memory so that the last used values are available upon re-energization of the signal modification device 100.

The control circuitry 110 may be modified in real time while operating the engine to provide immediate feedback regarding the operational change effected by the modification. The control circuitry 110 may furthermore be reset to its default map and modifier values by pressing and holding both the first switch 202 and second switch 204 when the signal modification device is energized.

The display 206 may be a 4-digit LCD display. That display 206 may present the number of the selected map when the user interface 200 is placed in map selection mode. After the map has been selected, presentation of the selected map may cease to be presented and the region and the associated modifier value may be presented on the display 206 after passage of a time such as several seconds.

When the display 206 is presenting map region and modifier value, the first digit of the display 206 may indicate "L" if the throttle position is in the low throttle position region of the map, "M" if the throttle position is in the middle throttle position region of the map, and "H" if the throttle position is in the high throttle position region of the map. The second digit of the display 206 may indicate "L" if the engine speed is in the low engine speed region of the map, "M" if the engine speed is in the middle engine speed region of the map, and "H" if the engine speed is in the high engine speed region of the map. The third and fourth digits of the display 206 may provide a two-digit modifier value associated with the displayed region.

While the signal conditioning and user interface systems, apparatuses, and methods have been described in detail and with reference to specific embodiments thereof, it will be apparent to one skilled in the art that various changes and modifications can be made therein without departing from the spirit and scope thereof. For example, the signal conditioning and user interface systems, apparatuses, and methods may be applied to signals other than those affecting fuel delivery to an engine. Thus, it is intended that the present invention cover the modifications and variations of this invention provided they come within the scope of the appended claims and their equivalents.

What is claimed is:

1. A signal modifying device having an input to be coupled to a fuel control output of an engine control unit carrying a fuel control signal and an output carrying a reduced fuel control signal to be coupled to a fuel injector.

2. The signal modifying device of claim 1, further comprising a second input to be coupled to a second signal, wherein a signal incident at the output of the signal modifying device is offset from the fuel control output based on the second signal.

3. A signal modifying device having an input to be coupled to a sensor providing a signal that affects a quantity of fuel delivered and an output carrying a signal indicating a lesser quantity of fuel than the sensor and to be coupled to an engine control unit.

4. The signal modifying device of claim 3, further comprising a second input to be coupled to a second signal, wherein a signal incident at the output of the signal modifying device is offset from the signal incident at the input based on the second signal.

5. A method of modifying a control table used in a signal modifying device, comprising:

selecting from the signal modifying device one of a plurality of regions of a control table;

inputting a modifier associated with the selected region of the control table from the signal modifying device; and limiting the modifier such that the modifier will not produce an output signal to be output from the signal modifying device that varies from a signal to be input into the signal modifying device by more than a predefined portion of the input signal.

6. The method of claim 5, wherein the modifier affects a quantity of fuel to be provided to an engine.

7. A method of modifying a control table used in a signal modifying device, comprising:

selecting from the signal modifying device one of a plurality of regions of a control table;

inputting a modifier associated with the selected region of the control table from the signal modifying device; and resetting the modifier to a default value.

8. The method of claim 7, wherein the resetting is performed by actuating a switch.

9. A method of modifying a set point that distinguishes two regions in a control table used in a signal modifying device, each region defined by a range of engine operation, comprising:

selecting from the signal modifying device one set point distinguishing the separation of at least two ranges; and inputting a value for the set point.

10. The method of modifying a set point of claim 9, wherein the set point distinguishes between a region and an interpolation band.

11. The method of modifying a set point of claim 9, further comprising limiting the set point such that a high set point of a range may not be set lower than a low set point of the range.

12. An engine control system, comprising:

an engine control unit having an output to be coupled to an actuator; and a signal modifying device having an input to be coupled to the output of the engine control unit and a modified output to be coupled to the actuator in parallel with the engine control unit output.

13. The engine control system of claim 12, wherein the actuator includes a fuel injector.

14. The engine control system of claim 12, wherein the output of the engine control unit is a pulse-width modulated signal that provides an on signal for a period of time and the modified output of the signal modifying device is a pulse-width modulated signal that provides an on signal for an additional period of time.

15. The engine control system of claim 14, wherein the additional period of time the output of the signal modifying device provides an on signal is a portion of the period of time the output of the engine control unit provides an on signal.

* * * * *